(12) United States Patent
Rigby et al.

(10) Patent No.: US 11,321,328 B2
(45) Date of Patent: May 3, 2022

(54) SYSTEM AND METHOD FOR CUSTOMIZED USER CONTENT

(71) Applicant: Immersyve Holdings, LLC, Celebration, FL (US)

(72) Inventors: C. Scott Rigby, Celebration, FL (US); Lars Solberg, Celebration, FL (US); Cody Dehaan, Celebration, FL (US)

(73) Assignee: Immersyve Holdings, LLC, Celebration, FL (US)

( * ) Notice: Subject to any disclaimer, the term of this patent is extended or adjusted under 35 U.S.C. 154(b) by 215 days.

(21) Appl. No.: 16/519,372

(22) Filed: Jul. 23, 2019

(65) Prior Publication Data

US 2021/0026857 A1    Jan. 28, 2021

(51) Int. Cl.
| | |
|---|---|
| *G06F 16/22* | (2019.01) |
| *G06F 16/2457* | (2019.01) |
| *G06F 3/01* | (2006.01) |
| *G06F 1/16* | (2006.01) |
| *H04B 1/3827* | (2015.01) |

(52) U.S. Cl.
CPC ........ *G06F 16/24578* (2019.01); *G06F 1/163* (2013.01); *G06F 3/016* (2013.01); *G06F 16/2264* (2019.01); *H04B 1/385* (2013.01)

(58) Field of Classification Search
CPC ................................................. G06F 16/24578
See application file for complete search history.

(56) References Cited

U.S. PATENT DOCUMENTS

| | | | |
|---|---|---|---|
| 8,172,577 B2 | 5/2012 | O'Malley | |
| 8,874,023 B2 | 10/2014 | Elzinga et al. | |
| 9,430,617 B2 | 8/2016 | Brust et al. | |
| 9,712,587 B1 | 7/2017 | Alfishawi et al. | |
| 9,934,363 B1 | 4/2018 | Hwang et al. | |
| 9,936,250 B2 | 4/2018 | Marci et al. | |
| 10,039,485 B2 | 8/2018 | Flax et al. | |
| 2013/0063550 A1* | 3/2013 | Ritchey .................. G06F 3/015 348/36 |
| 2014/0163927 A1* | 6/2014 | Molettiere .......... A63B 24/0062 702/189 |
| 2015/0374300 A1* | 12/2015 | Najarian .............. A61B 5/7253 604/66 |
| 2016/0171514 A1* | 6/2016 | Frank .................... G06Q 30/02 705/7.29 |
| 2016/0300252 A1* | 10/2016 | Frank ................ G06F 16/24578 |
| 2016/0306844 A1* | 10/2016 | Frank ..................... G06N 7/005 |
| 2017/0189752 A1* | 7/2017 | Mohrman ............ A61B 5/7271 |
| 2017/0249434 A1* | 8/2017 | Brunner ............. G06F 16/3334 |

* cited by examiner

*Primary Examiner* — Eliyah S. Harper
(74) *Attorney, Agent, or Firm* — Jeffri A. Kaminski; Venable LLP

(57) ABSTRACT

Systems, methods, and computer-readable storage media for how to select, suggest, and modify content, which is relevant to the user, on a user interface. The system does this by combining physiological data, location data, and historical data to create a multi-dimensional user state of the user, where at least one dimension is time. The system also identifies available content, ranks the available content based on the multi-dimensional user state, and transmits a user interface a suggestion for a top-ranked item within the ranked list of available content.

19 Claims, 7 Drawing Sheets

SYSTEM AND METHOD FOR CUSTOMIZED USER CONTENT

BACKGROUND

1. Technical Field

The present disclosure relates to customizing user content, and more specifically to suggesting and modifying content based on a combination of physiological and psychological data.

2. Introduction

Presenting and suggesting customized content to a user interface requires information about the user. Possibly the most common example at present are banner advertisements for websites, which often use a user's previous web-browsing history to provide specific content to that user. With wearable devices becoming more ubiquitous, user interfaces may vary based on an individual's given physiological condition, such as if the user's heart beat is irregular. In some cases, a mental state of the user is predicted and used to suggest specific content, suggesting different content if the user is sad versus happy.

However, in all these cases, the content modifications and suggestions are based on a current status of the user, rather than how the user state has evolved over time, or how the user state has evolved with respect to other factors or influences. To use an analogy, previous approaches inadequately used a static view to measure something that is dynamically in motion. Such methods to determine user status, and make subsequent modifications/suggestions to content on a user interface based on that user status, fail to account for why the user status has changed.

Technical Problem

How to program a computer system to select, suggest, and modify content which is relevant to the user.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media a technical solution to the technical problem described. A method for performing the concepts disclosed herein can include receiving, at a server from a sensor, physiological data captured by the sensor from a user; receiving, at the server from a computing device, location data of the user; sending a request to a historical database for historical user data for the user; receiving, from the historical database, the historical user data; generating, via a processor of the server, and based on the physiological data, the location data, and the historical user data, a multi-dimensional user state of the user, the multi-dimensional user state having a plurality of dimensions, where at least one dimension in the plurality of dimensions is time; sending, from the server to a content database, a request for a list of available content; receiving, at the server from the content database, the list of available content; ranking, via the processor of the server and using the multi-dimensional user state, content within the list of available content based on a comparison to the multi-dimensional user state, resulting in a ranked list of available content; and transmitting, from the server to the computing device, a suggestion comprising at least a top-ranked item within the ranked list of available content.

A system configured to perform the concepts disclosed herein can include a processor; and a non-transitory computer-readable storage medium having instructions stored which, when executed by the processor, cause the processor to perform operations comprising: receiving, from a sensor, physiological data captured by the sensor from a user; receiving, from a computing device, location data of the user; sending a request to a historical database for historical user data for the user; receiving, from the historical database, the historical user data; generating, based on the physiological data, the location data, and the historical user data, a multi-dimensional user state of the user, the multi-dimensional user state having a plurality of dimensions, where at least one dimension in the plurality of dimensions is time; sending, to a content database, a request for a list of available content; receiving, from the content database, the list of available content; ranking content within the list of available content based on a comparison to the multi-dimensional user state, resulting in a ranked list of available content; and transmitting, to the computing device, a suggestion comprising at least a top-ranked item within the ranked list of available content.

A non-transitory computer-readable storage medium configured as disclosed herein can have instructions stored which, when executed by a computing device, cause the computing device to perform operations which include receiving quantified subjective data associated with a user; receiving, from a computing device, location data of the user; sending a request to a historical database for historical user data for the user; receiving, from the historical database, the historical user data; generating, based on the quantified subjective data, the location data, and the historical user data, a multi-dimensional user state of the user, the multi-dimensional user state having a plurality of dimensions, where at least one dimension in the plurality of dimensions is time; sending, to a content database, a request for a list of available content; receiving, from the content database, the list of available content; ranking content within the list of available content based on a comparison to the multi-dimensional user state, resulting in a ranked list of available content; and transmitting, to the computing device, a suggestion comprising at least a top-ranked item within the ranked list of available content.

DETAILED DESCRIPTION

Figure 1:
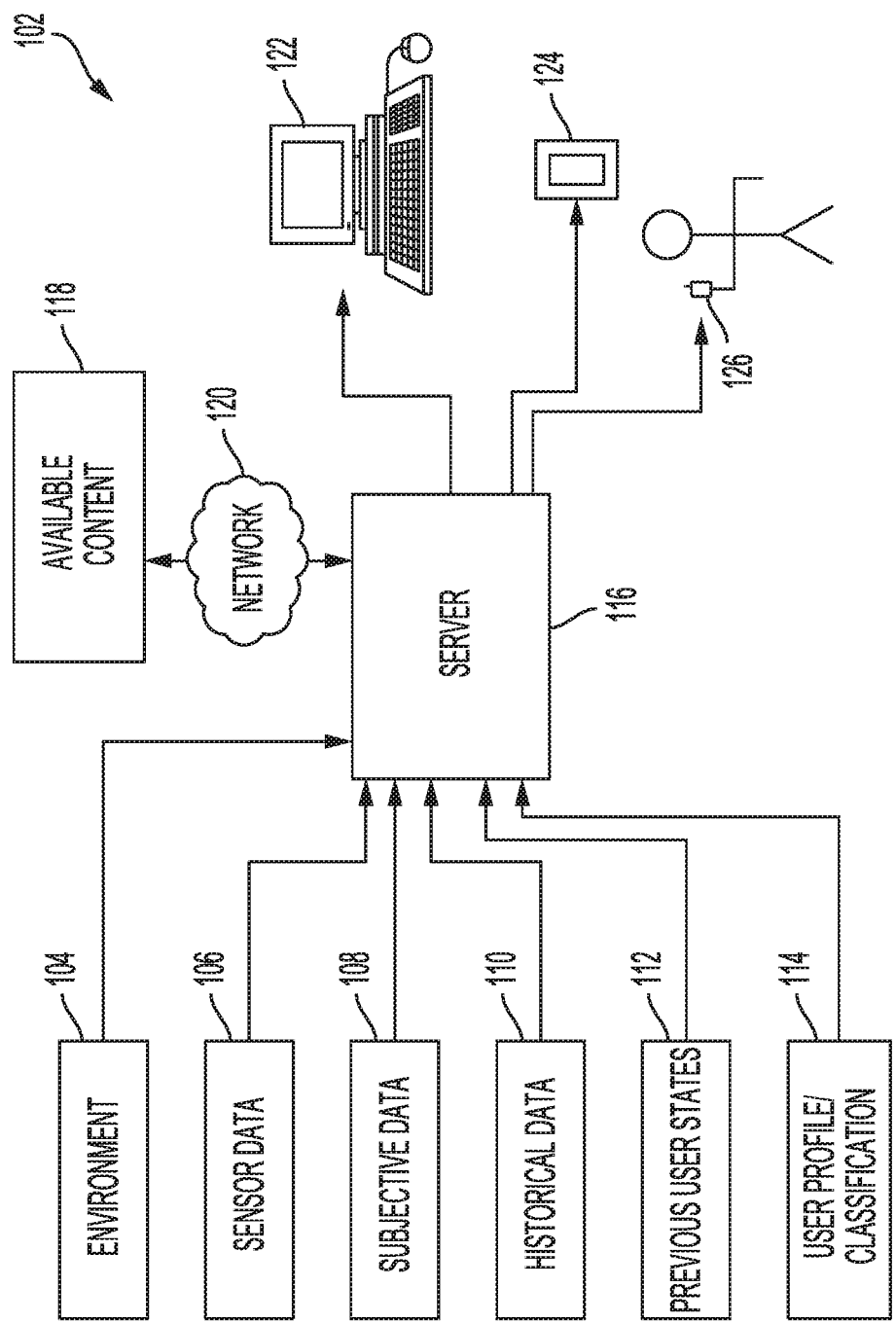
FIG. 1 illustrates an example system embodiment.

Various embodiments of the disclosure are described in detail below. While specific implementations are described, it should be understood that this is done for illustration purposes only. Other components and configurations may be used without parting from the spirit and scope of the disclosure.

The disclosed systems and methods allow computer systems to be programmed to select, suggest, and modify content onto a user interface. This can be accomplished, for example, by building a multi-dimensional model of a user's user state, with at least one of the dimensions being time, and evaluating the user state changes and reactions to types of stimuli. At any single moment in time, the multi-dimensional model has at least 2+ dimensions, such that the multi-dimensional model with time is a 3D+ (three-dimensional plus) model. The inputs to the system can be objective (such as sensor inputs from cameras, heart rate monitors, smart watches, keyboard and/or mouse usage rates, touch screen usage data, etc.) or subjective (such as user inputs indicating how the user currently feels, mentally, emotionally, and/or physically). The subjective inputs may from the user to which content is being directed, from members of a team to which the user belongs, people in a circumstances similar to that of the user, and/or from a supervisor (such as a coach feeling like her team isn't performing to their potential).

To identify content for a user using a multi-dimensional model of the user state can require knowing (1) how the user has reacted to specific content and stimuli in the past, and (2) what the desired user state is.

Regarding point (1), systems configured according to this disclosure can combine user data, such as physiological data, location data, and historical user data to generate a multi-dimensional model where at least one variable is time. The model can be used to identify how the user has reacted to specific content and stimuli in the past, with the model identifying specific correlations between content/stimuli and the associated effects on the user state. For example, the model may use historical data about previous user states to determine that after fifteen minutes in a particular location, the user state changes dramatically. Similarly, the model may use historical data to determine that when the user is presented a particular type of advertisement, the user state changes from a positive mood to a negative mood, as evidenced by both objective and subjective evidence.

Based on this analysis and these correlations, the multi-dimensional user state can also predict what the user state will be when the user is presented new content, or is placed into a different circumstance. That is, the multi-dimensional model can be used to predict, based on how the user (or other users similar to the user) have reacted in the past. In order for the system to properly suggest or modify content for the user, the system also determines a recommended user state. Determination of a recommended user state (point (2) above) can be determined based on a user input, such as "I'm tired and I want to feel rested," or "I'm angry and I want to feel happy." The determination of desired user state can also be made based on historical data. If, for example, the user has previously indicated that they are frustrated at a given time, and the system identified a particular keyboard strike rate at that time, when the system detects that strike rate again the system can determine that the user is again frustrated and seek to calm the user. Yet another way the system can determine the desired user state is based on the desired states of similar users. If the user is identified as an optimist, the system can seek to adjust the user's user state based on how other optimists have reacted in similar circumstances. Likewise, if the user is an athlete, the system can seek to adjust the user's user state based on how other athletes have reacted in similar circumstances.

The content which is suggested or modified to the user based on the multi-dimensional user state can be, for example, advertisements, music, movies/television/videos, podcasts, live streams, exercise suggestions, food suggestions, restaurant suggestions, travel route suggestions, etc. For example, if a user is watching television at home, and the multi-dimensional user state is used to predict that the user is in a sad mood and wishes to feel happier, the system can suggest a particular television show which has, in the past, moved the user from a sad mood to a happier mood. As another example, if the user is exercising, and the multi-dimensional user state is used to predict that the user is "going through the motions" and not exercising to their potential, but would like to exercise to their potential, the system can suggest a particular song known to motivate the user. As yet another example, if the user is looking for food while driving home, the system may predict, based on the multi-dimensional user state, that the user would likely prefer a fast-food restaurant over an upscale/sit-down restaurant. In yet another example, the system can be configured to recommend content for the user based on professional growth and quality of life at work, and make content recommendations based on the multi-dimensional user state of the individual. Exemplary data which can be used in such an example can include body posture (slumping shoulders, rounded back), heart rate, HRV score, previously provided goals of the individual, as well as subjective scores provided by management, peers, or the individual themselves.

The content suggestions and/or modifications can be sent to, or otherwise modify, a user interface. For example, with a suggestion, if the user is interacting with a personal computer, tablet, smartwatch, or other computing device, the suggestions and/or modifications can be sent to the screen of that device, thereby allowing the user to see the suggestions and select if they wish to modify the content based on the suggestion. Likewise, if the system is modifying content based on the multi-dimensional user state (without asking for explicit permission from a user to modify the content), the system may transmit the modified content directly to the screen of the user's device. For example, if the system identifies that the user, based on the user's multi-dimensional user state, would be a good match for a specific recommendation or specific piece of content, the system may automatically present that particular recommendation or content to the user (on a user interface or audibly). If the system is interacting with a coach or supervisor, the system may detect that particular content may be useful in changing the user state of the entire group, and may ask the coach or supervisor for permission to provide the content to the individual members of the group, or for permission to provide the content to the group as a whole.

The content which is available for suggestion can be, for example, stored in one or more databases. A database can be directly accessible, or can be accessible across a network, such as the Internet. The system can place a call, or request, to databases to identify what content is available, and in a response to the request can receive a list of available content. The system can then rank that available content based on the user's multi-dimensional user state (and the user state desired). The system can then modify or suggest content on the user interface based on the ranked list.

Content modifications or suggestions can, broadly, be segmented into two categories (with potential overlap): activity content and influence content. Activity content are pieces of content which the user can consume or participate in, such as an advertisement, a television show, a music suggestion, a workout suggestion, etc. In each of these cases, the user participates in an activity involving the selected content (even if that participation is only to decline a suggestion). By contrast, influence content is content which is selected with the purpose of influencing the user's current state. For example, if the user's multi-dimensional user state indicates the user is exhausted and angry because of a reason "A", influence content "B" may be selected and suggested to make the user happier in a specific manner. If the user's multi-dimensional user state indicates the user is exhausted and sad for reason "X", influence content "Y" may be selected to cheer the user up.

Within the multi-dimensional user state are relationships between the various stimuli, activities, content, and user statuses. While the specifics of how the various pieces of data are inter-related can vary from configuration to configuration, the formation of the multi-dimensional user state can have: (1) elements which are specific to a given moment in time, such as a stimulus, the "static" state of the user at that point in time, and user behavior at that point in time; and (2) elements which form relationships across the respective moments in time. In other words, the multi-dimensional user state is formed of data which is specific to a particular moment in time, as well as relationships within the data between at least two different points in time. Preferably, the "static" user state has two or more data points at each point in time, as well as one or more stimuli being presented to the user at each point in time and the user's actions at each point in time. The multi-dimensional user state can also have, as part of the "static" values for a single moment in time, values based on a combination of the different static values. For example, within the static values for a singular moment in time can be one or more weighted numbers based on the individual static values.

In some cases, a multi-dimensional user state can be generated at a single point in time based on multiple data inputs. Using this "static" multi-dimensional user state, the system can make recommendations based on historical data for similar users according to age, race, gender, economic status, education, and/or other demographic data using the historical database. For example, upon generating a profile for a new user, the new user will have no longitudinal data which the system can use to make recommendations. Instead, the system can compare the user's multi-dimensional user state to where in time or circumstance similar multi-dimensional user states have been present among similar individuals (such comparison can make use of a historical database of multi-dimensional user states). Based on that comparison, the system can make a recommendation, despite not having data over time for the specific individual.

Content on the user interface can be replaced and/or modified. In some instances, this can take the form of a content suggestion being transmitted to and displayed on the user interface, at which point the user can select if they wish to display the content. In other instances, content which is already being displayed on the user interface can be changed or modified based on the multi-dimensional user state and the ranked, available content. For example, if a recommendation for content is being displayed on the user interface, the system can modify that recommendation, changing it to a new or updated recommendation. As another example, if a user is listening to music, and the system determines (through analysis of the multi-dimensional user state) that the user's state should be shifted in some manner, the system can suggest, through a notification on the user interface, a change in the music which would affect the user state.

Examples of these and other configurations will be further discussed in conjunction with the figures provided.

FIG. 1 illustrates an example system embodiment 102. In this example, a server 116 receives objective and/or subjective data from multiple sources 104-114. Environmental data 104 can be data identifying a location, or a location type, of the user. For example, the environmental data can be location coordinates such as GPS (Global Positioning System) data or cellular triangulation information. The environmental data can also identify if the user is in a kitchen, living room, office, park, or other descriptive type for the location.

The server 116 can also receive sensor data 106, examples of which can include physiological sensors (such as sensors on a smartwatch), cameras which record how the user behaves and reacts, data from a keyboard or mouse (such as how fast the user is typing, moving the mouse, etc.), etc. Subjective data 108 received by the server 116 can include data which the user themselves enter, such as how they feel (tired, energized, sad, happy, angry, etc.), or which can be entered by a third party expert, such as a doctor, therapist, supervisor, or manager.

Historical data 110 can include information regarding what stimuli the user has been previously exposed to and/or how the user reacted to those previous stimuli. The historical data 110 can also include information about previous environmental data 104, sensor data 106, and/or subjective data 108. The previous user states 112 can include previously generated or identified user states. In some configurations, this can be one or more previous multi-dimensional user states, where at least one of the dimensions is time, whereas in other configurations the previous user states can be for single points in time. The user profile/classification 114 can be a determined profile, group, or class of the user. Exemplary classifications can be "optimist," "pessimist," "athlete," "mother," "father," "easily angered," "country music enthusiast," etc.

The server 116 receives the inputs 104-114 and, using those inputs, generates a multi-dimensional user state. The server 116 also identifies available content 118. The available content 118, as illustrated, is contained in a database across a network 120, such as the Internet. In other configurations, the available content 118 can be stored in a database within the server 116. Upon generating the multi-dimensional user state and identifying the available content 118, the server 116 identifies which content, of the available content, should be suggested to the user, and transmits that selected content to the user interface of the user's computing device. Exemplary user interfaces of computing devices can include a monitor for a computer 122, the screen of a smartphone 124, and the screen of a smartphone 126 being worn by the user. As the server 116 determines that the content being displayed should change, the server 116 transmits updates or suggestions to the user interfaces of the respective devices 122, 124, 126, where the suggestions or updates are displayed.

Figure 2:
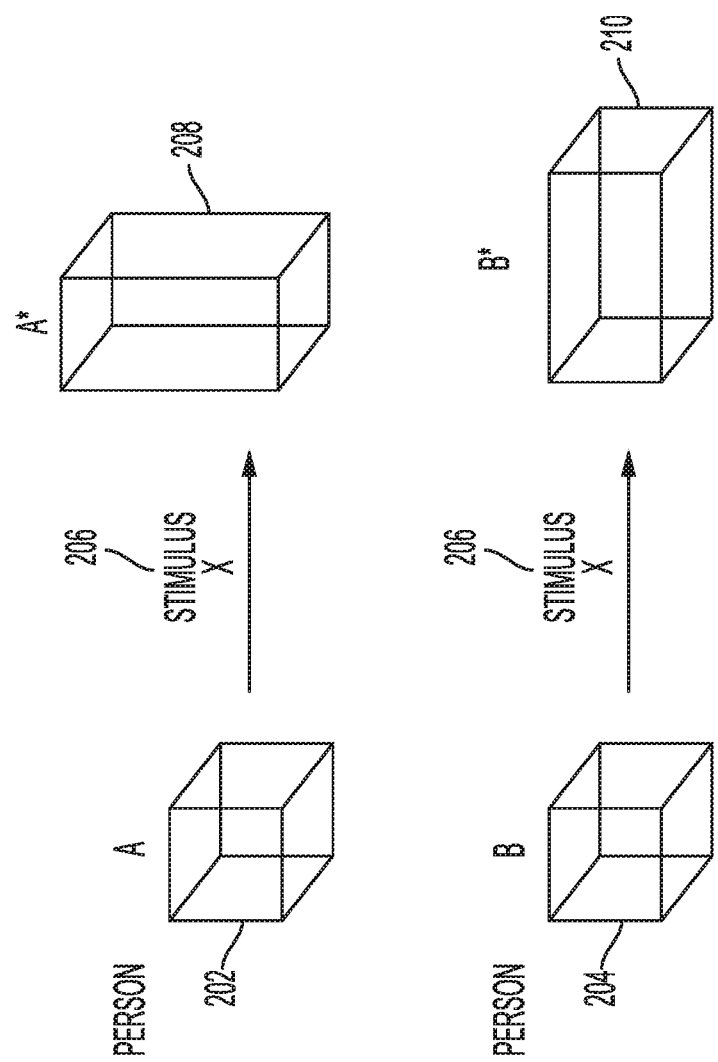
FIG. 2 illustrates example multi-dimensional user statuses which change in reaction to a stimulus.

FIG. 2 illustrates example multi-dimensional user statuses which change in reaction to a stimulus. In this example, two identical multi-dimensional user statuses 202, 204 for a single moment in time are illustrated, with one 202 corresponding to person A and another 204 corresponding to person B. In this example, at the time illustrated, the multi-dimensional user statuses are three dimensional (3D), and identify values and relationships which help quantify the user state of each respective user (person A and person B). In this example, the user states 202, 204 are identical to illustrate that despite having similar user states, when exposed to a stimulus X 206, the user states 202, 204 change in distinct ways. For example, the person A user state changes from the initial user state 202 into user state 208, and the person B user state changes from the initial user state 204 into user state 210, despite the respective user being exposed to the same stimulus 206. The reasons for the distinct reactions (202 to 208 and 204 to 210) to the stimulus 206 can be determined using a multi-dimensional user state over time, such that the system can predict how the users will react to specific stimuli, or content, and make suggestions based on that prediction.

Figure 3:
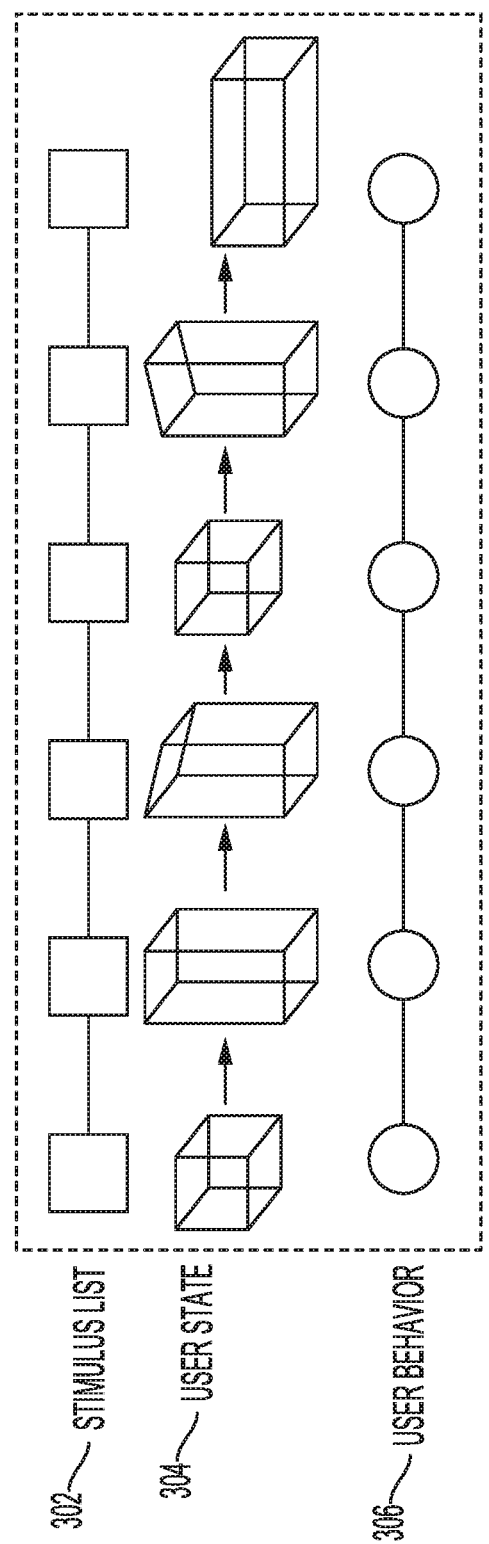
FIG. 3 illustrates example data which can form the basic structure of a multi-dimensional user status.

FIG. 3 illustrates example data which can form the basic structure of a multi-dimensional user status. One piece of data can be a stimulus list 302 which lists what stimuli the user has been exposed to at various points in time. The stimulus list 302 can include multimedia content which is being displayed on the user interface, other multimedia content seen by the user, interactions with other people, or any other type content which can be considered "influence content."

Another type of data stored is a record of multi-dimensional user states 304 previously identified at specific points in time. As illustrated, each of the multi-dimensional user states 304 is, at a specific moment in time, three dimensional. However, in practice the multi-dimensional user states 304 at specific moments in time can be less than three (e.g., two) dimensions, or can have more than three dimensions. In addition, the multi-dimensional user states 304 can include weighted results for a single point in time, where such weighted results are weighted based on two or more of the values used to form multi-dimensional user state at a given point in time.

Yet another type of data stored can be the user behavior 306, indicating how the user is physically behaving or reacting at any given point in time. This can include how fast the user is reacting to content displayed on a user device, emotions captured in a camera feed (and analyzed using image processing), heart rate during the presentation of specific content, etc.

Finally, the multi-dimensional user state can further include relationships between the various factors 302, 304, 306 over time. For example, the system can identify that the user state reverts to a baseline value after being presented certain content, or after the user behaves in a certain way. This identified relationship, which extends over time between pieces of content, can be stored as part of the multi-dimensional user state.

Figure 4:
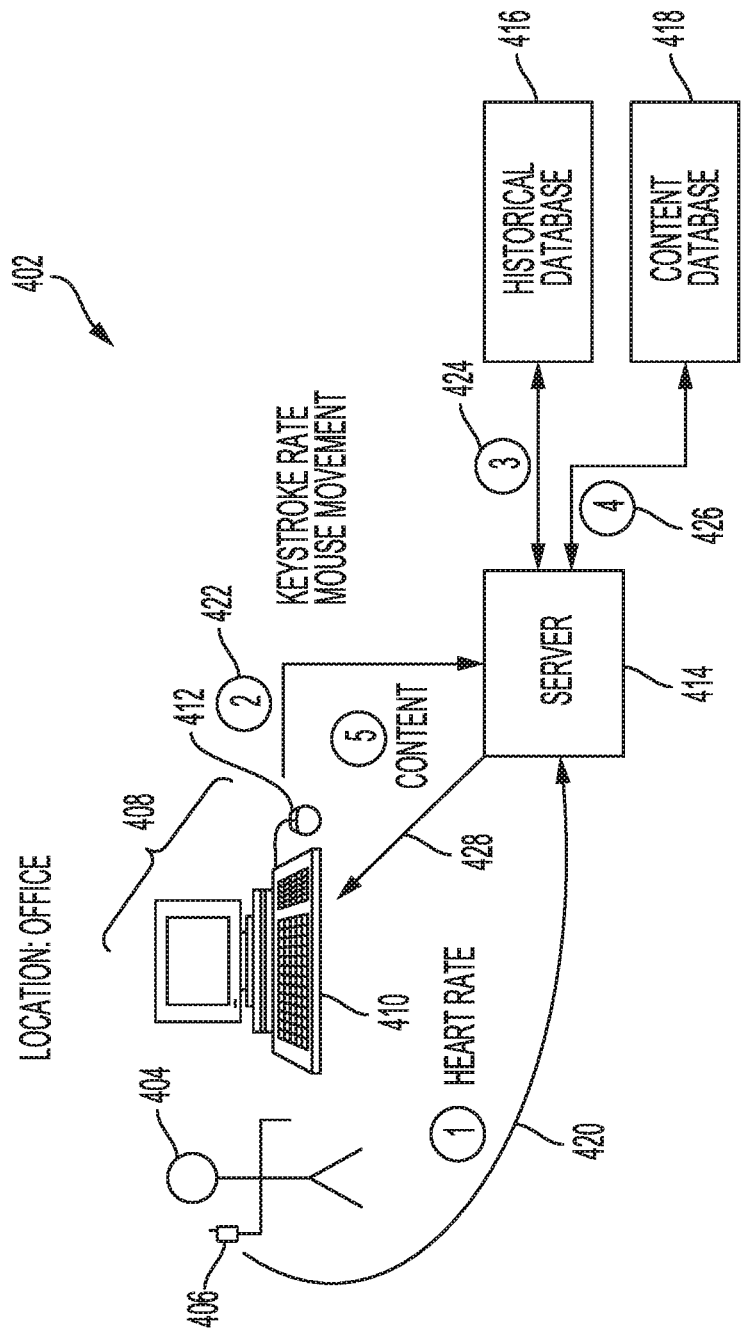
FIG. 4 illustrates an example of a user receiving content suggestions in an office environment.

FIG. 4 illustrates an example 402 of a user 404 receiving content suggestions in an office environment. In this example, a user 404 is wearing a smartwatch 406 while working at a computer 408 with a mouse 412 and keyboard 410. As the user 404 is working, her smartwatch 406 is transmitting her heartbeat 420 to a server 414. At the same time, as the user 404 is working, the keystroke rate and mouse movement are transmitted 422 from the computer 408 to the server 414. The server 414 interacts with a historical database 416 to obtain past data regarding previous user states, past interactions, previously viewed content, etc. The server 414 also interacts with a content database 418 to identify what content is currently available. Using, for example, the heartrate 420, the keystroke rate/mouse movement 422, data from the historical database 416, the server 414 generates a multi-dimensional user state, where at least one of the dimensions is time. The server 414 then ranks the available content from the content database 418, and transmits a content suggestion or modification to the screen of the computer system 408. In some cases, rather than transmitting the content suggestion or modification to the screen of the computer system 408, the server 414 can transmit the content suggestion or modification to the user interface of the smartwatch 406 being worn by the user.

While the example illustrated in FIG. 4 communicates physiological data, a heartbeat 420, to the server 414 for analysis, in other configurations the data transmitted can be physiological, behavioral, psychological, subjective, and/or objective. In other words, if the data can be quantified, it can be transmitted to the server 414 for analysis.

Figure 5:
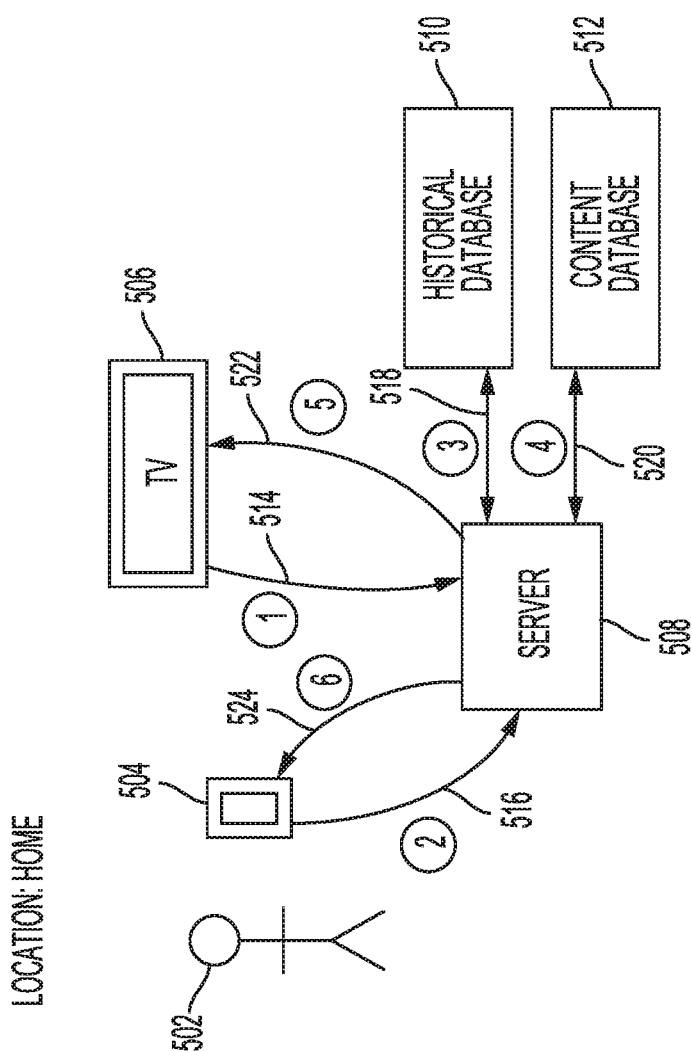
FIG. 5 illustrates an example of a user receiving content suggestions in a home environment.

FIG. 5 illustrates an example of a user 502 receiving content suggestions in a home environment. In this example, the user 502 is watching television 506 at home while using a smartphone 504. The television 506 is transmitting 514 information to a server 508 about the content being viewed by the user 502, which can include shows and/or advertisements being displayed. The smartphone 504 is also transmitting 516 information to the server 508, such as, for example, what advertisements (such as banner advertisements) are being displayed on the smartphone 504, what games are being played, tactile information about how the user 502 is interacting with the touch screen of the smartphone 504, images from the camera of the smartphone 504, etc. The server 508 interacts with a historical database 510 to obtain past data regarding previous user states, past interactions, previously viewed content, etc. The server 508 also interacts with a content database 512 to identify what content is currently available. Using, for example, the data from the smartphone 516, the data from the television 514, and the data from historical database 510, the server 508 generates a multi-dimensional user state, where at least one of the dimensions is time. In other configurations, the multi-dimensional user state can include subjective inputs as well. The server 508 then ranks the available content from the content database 512, and transmits a content suggestion or modification 522, 524 to the screen of the television 506 and/or to the user interface of the smartphone 504.

Figure 6:
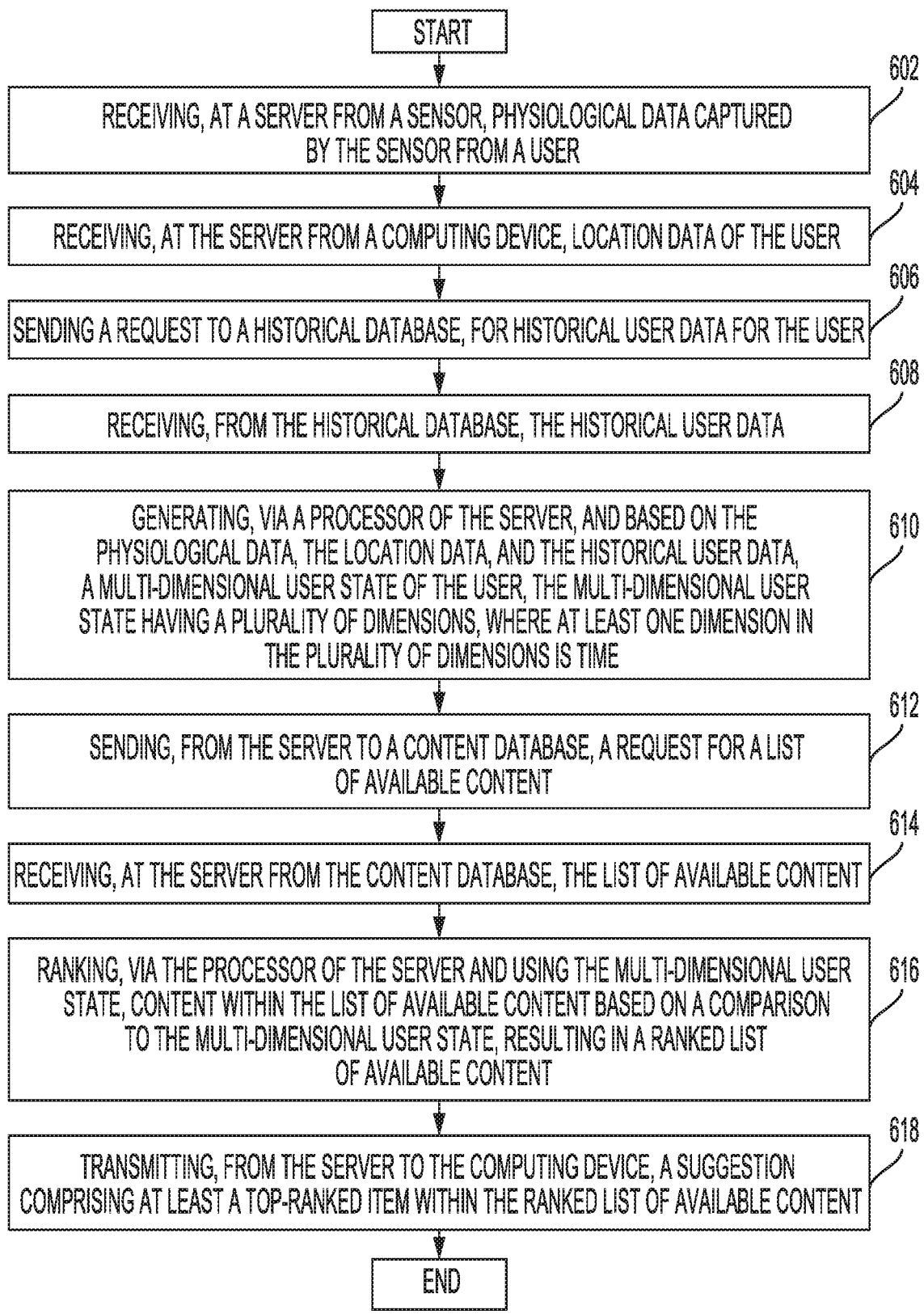
FIG. 6 illustrates an example method embodiment.

FIG. 6 illustrates an example method embodiment. The steps outlined herein are exemplary and can be implemented in any combination thereof, including combinations that exclude, add, or modify certain steps. The example system provided, a server, can be replaced with any other computing system configured according to the principles disclosed herein. In this example, the server receives, from a sensor, physiological data captured by the sensor from a user (602). In some embodiments, the sensor can be a component of a wearable device, such as a smartwatch, heart rate monitor, etc., and the physiological data can include a heartbeat of the user captured by the smartwatch. In other embodiments, the sensor can be a camera, and the physiological data can include facial movement of the user captured by the camera. In another example, the sensor can be an accelerometer which detects how fast the user is moving (or more precisely, starting and stopping). In yet other embodiments, the system can use a combination of multiple sensors to detect the physiological data of the user, such as a smartwatch in combination with a camera. In such configurations, the respective pieces of the physiological data can be separately received by the server, then combined and analyzed by the server.

The server also receives, from a computing device, location data of the user (604). This location data can be based on GPS (Global Positioning System), telecommunication triangulation, IP (Internet Protocol) address, etc. The location data can also identify location types, such as an office location, a gymnasium location, a home location, a kitchen location, a park location, etc. That is, the location information may be based on a coordinate-based, latitude/longitude system, or may be based on a location-type classification system.

The server sends a request to a historical database for historical user data for the user (606). The historical user data can include, for example, previous actions of the user, previous stimuluses (content) provided to the user, previous multi-dimensional user states of the user which were identified by the server, previous user states of the user which were identified by the user (for example, the users themselves can provide a status), previous physiological data, previous location data, or any other past data about the user. In some cases, the previous physiological data and the previous user actions can directly correspond to times when the previous content was being provided to the user, and the previous multi-dimensional user states of the user can be based on that previous content and previous physiological data. Often, the historical database can include a large amount of information, and the request can be for specific portions of that stored information. The server then receives, from the historical database, the historical user data (608).

The server generates, via a processor, and based on the physiological data, the location data, and the historical user data, a multi-dimensional user state of the user, the multi-dimensional user state having a plurality of dimensions, where at least one dimension in the plurality of dimensions is time (610). For example, the multi-dimensional user state can have two or more dimensions for any single moment in time, such that with time added the ability for human beings to interpret the data clearly becomes impossible. The dimensions for a multi-dimensional mental state of the user can include, for example, autonomy, relatedness, and mastery, as well as relational values identifying relationships between the dimensions over time. For other multi-dimensional user states, the multi-dimensional user state can be a physiological user state with multiple dimensions over time, or a combination of mental and physiological user states. In yet other embodiments, the multi-dimensional mental state can use data which is both objective and subjective, and identify how the data changes across time and/or other factors.

The server sends, to a content database, a request for a list of available content (612), and receives, from the content database, the list of available content (614). Exemplary content can include exercise/movement suggestions, advertisements, songs, television shows or movies, or any other content which can be stored in a database and consumed or used by a user. The system then ranks, using the multi-dimensional user state, content within the list of available content based on a comparison to the multi-dimensional user state, resulting in a ranked list of available content (616). In other words, the system is determining what content would rank highest for the user based on how the user's user state has evolved over time in reaction to specific content, circumstances, and location in conjunction with other factors, such as the user's physiological and/or mental state.

In part, this determination requires knowledge of what user state the user would like to be in in the future. For example, if the user is sad, the user may wish to remain sad, which will dictate different content than if the user wishes to become happy. Likewise, if the user feels lethargic, the system needs to be able to determine if the user is sick (and needs to rest) or if the user needs to become motivated to action. Making this determination can be based on previous user behavior. For example, the last time the multi-dimensional user state appeared as it currently appears can be used to determine what the user was trying to do, and the system can seek to augment that activity. Likewise, this determination can be based on what other users, similar to the user, have attempted to do in the past. For example, if the user is an optimist, the system can rank the content based on how other optimists have responded in the past. Similarly, if the user is an athlete, the system can rank the content based on how similar athletes have responded. Determination of similar groups can be based on user behavior over time, demographics, education, geographic location, psychological profile, physiological profile, etc. In some configurations, multiple recommendations can be provided to the user and the user can select (or ignore) content from those recommendations. In other configurations, the system can provide a single recommendation, which the user can select or ignore.

The system then transmits, to the computing device, a suggestion comprising at least a top-ranked item within the ranked list of available content (618). In other configurations, the system can send a signal modifying content on a user interface based on the ranking.

In some configurations, the method can further include: receiving keystroke data from a keyboard of the computing device and receiving mouse movement data from a mouse of the computing device, where the generating of the multi-dimensional user state is further based on the keystroke data and the mouse movement data.

In some configurations, the method can further include: receiving tactile data from a touchscreen of the computing device, where the generating of the multi-dimensional user state is further based on the tactile data.

In some configurations, the historical user data can include a user profile of the user, the user profile classifying the user as having user states similar to those of a group of other users, where generating the multi-dimensional user state of the user is further based on how the user and the group of other users have previously reacted in similar circumstances.

In some configurations, the generating of the multi-dimensional user state can include identifying correlations over time between the changes in the physiological data, the location data, and the historical data. In such configurations, the ranking of the content can be further based on the correlations over time.

In some configurations, generating of the multi-dimensional user state is further based on (1) behavioral data of the user, and (2) psychological data of the user. Behavioral data can, for example, include specific reactions to stimuli. Exemplary psychological data can include quantifiable objective and/or subjective data regarding the psychological state of the user.

Figure 7:
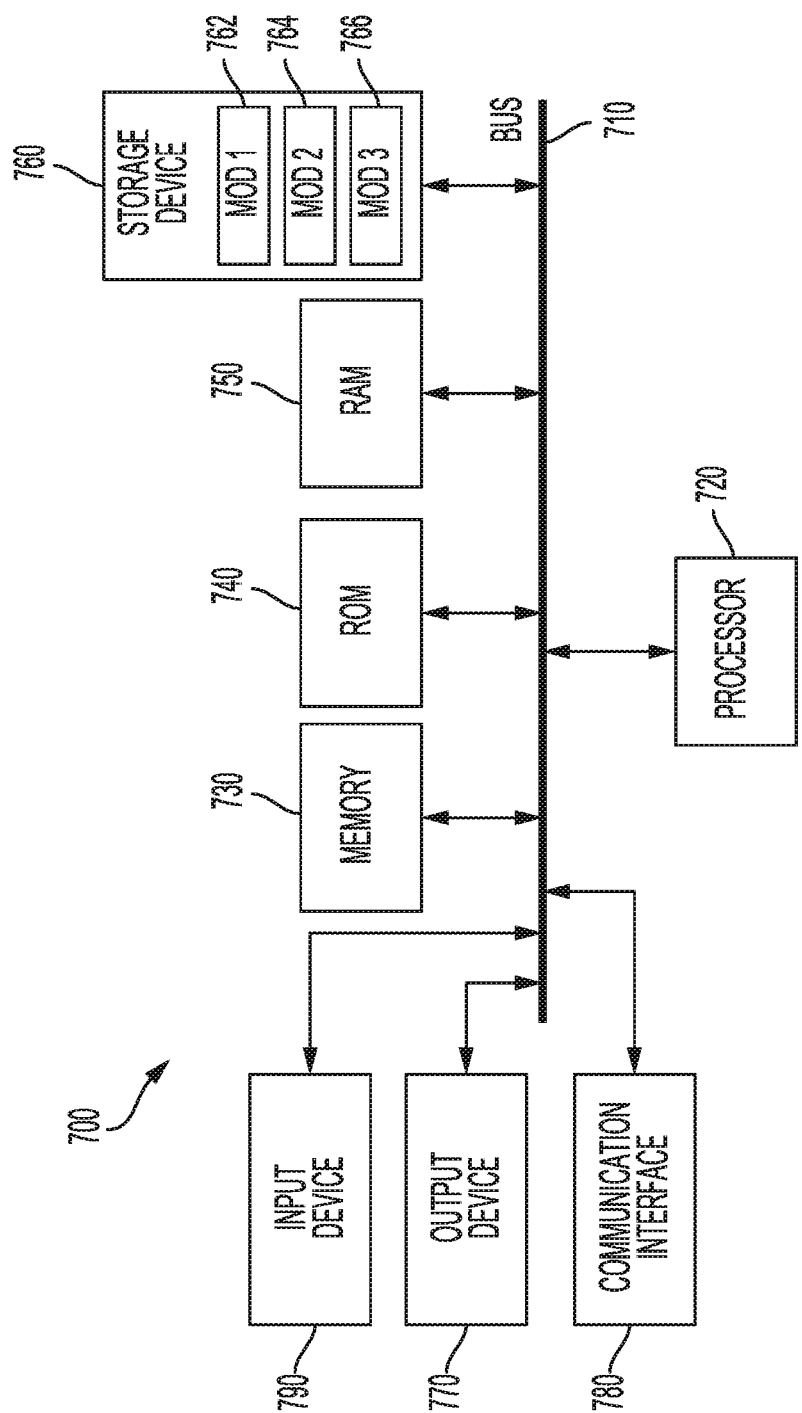
FIG. 7 illustrates an example computer system.

With reference to FIG. 7, an exemplary system includes a general-purpose computing device 700, including a processing unit (CPU or processor) 720 and a system bus 710 that couples various system components including the system memory 730 such as read-only memory (ROM) 740 and random access memory (RAM) 750 to the processor 720. The system 700 can include a cache of high-speed memory connected directly with, in close proximity to, or integrated as part of the processor 720. The system 700 copies data from the memory 730 and/or the storage device 760 to the cache for quick access by the processor 720. In this way, the cache provides a performance boost that avoids processor 720 delays while waiting for data. These and other modules can control or be configured to control the processor 720 to perform various actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general purpose processor and a hardware module or software module, such as module 1 762, module 2 764, and module 3 766 stored in storage device 760, configured to control the processor 720 as well as a special-purpose processor where software instructions are incorporated into the actual processor design. The processor 720 may essentially be a completely self-contained computing system, containing multiple cores or processors, a bus, memory controller, cache, etc. A multi-core processor may be symmetric or asymmetric.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 such as a hard disk drive, a magnetic disk drive, an optical disk drive, tape drive or the like. The storage device 760 can include software modules 762, 764, 766 for controlling the processor 720. Other hardware or software modules are contemplated. The storage device 760 is connected to the system bus 710 by a drive interface. The drives and the associated computer-readable storage media provide nonvolatile storage of computer-readable instructions, data structures, program modules and other data for the computing device 700. In one aspect, a hardware module that performs a particular function includes the software component stored in a tangible computer-readable storage medium in connection with the necessary hardware components, such as the processor 720, bus 710, display 770, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 700 is a small, handheld computing device, a desktop computer, or a computer server.

Although the exemplary embodiment described herein employs the hard disk 760, other types of computer-readable media which can store data that are accessible by a computer, such as magnetic cassettes, flash memory cards, digital versatile disks, cartridges, random access memories (RAMs) 750, and read-only memory (ROM) 740, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
   receiving, at a server from a sensor, physiological data captured by the sensor from a user;
   receiving, at the server from a computing device, location data of the user;
   receiving behavioral data of the user;
   receiving subjective psychological data of the user;
   generating, via a processor of the server based on (1) the physiological data, (2) the location data, (3) the behavioral data, and (4) the subjective psychological data, a multi-dimensional user state of the user, the multi-dimensional user state having a plurality of dimensions, where at least one dimension in the plurality of dimensions is time;
   sending, from the server to a content database, a request for a list of available content;
   receiving, at the server from the content database, the list of available content;
   ranking, via the processor of the server and using the multi-dimensional user state, content within the list of available content based on a comparison to the multi-dimensional user state, resulting in a ranked list of available content; and
   transmitting, from the server to the computing device, a suggestion comprising at least a top-ranked item within the ranked list of available content.

2. The method of claim 1, wherein the sensor is a component of a wearable device.

3. The method of claim 2, wherein:
   the wearable device is a smartwatch worn by the user;
   the sensor is a component of the smartwatch; and
   the physiological data captured by the sensor comprises a heartbeat of the user captured by the smartwatch.

4. The method of claim 1, wherein:
   the sensor is a camera; and
   the physiological data captured by the sensor comprises facial movement of the user captured by the camera.

5. The method of claim 1, further comprising:
   receiving keystroke data from a keyboard of the computing device; and
   receiving mouse movement data from a mouse of the computing device,
   wherein the generating of the multi-dimensional user state is further based on the keystroke data and the mouse movement data.

6. The method of claim 1, further comprising:
receiving tactile data from a touchscreen of the computing device,
wherein the generating of the multi-dimensional user state is further based on the tactile data.

7. The method of claim 1, wherein the user data comprises:
previous content provided to the user;
previous physiological data of the user while the previous content was provided to the user;
previous user actions made by the user while the previous content was provided to the user; and
previous multi-dimensional user states of the user based on the previous content and the previous physiological data.

8. The method of claim 1, wherein:
the user data comprises a user profile of the user, the user profile classifying the user as having user states similar to those of a group of other users; and
generating the multi-dimensional user state of the user is further based on how the user and the group of other users have previously reacted in similar circumstances.

9. The method of claim 1, wherein the multi-dimensional user state comprises a multi-dimensional mental state of the user over time.

10. The method of claim 1, wherein the generating of the multi-dimensional user state further comprises identifying correlations over time between the changes in the physiological data, the location data, and the data, and wherein the ranking of the content is further based on the correlations over time.

11. A system, comprising:
a processor; and
a non-transitory computer-readable storage medium having instructions stored which, when executed by the processor, cause the processor to perform operations comprising:
receiving, from a sensor, physiological data captured by the sensor from a user;
receiving, from a computing device, location data of the user;
receiving behavioral data of the user;
receiving subjective psychological data of the user;
generating, based on (1) the physiological data, (2) the location data, (3) the behavioral data, and (4) the subjective psychological data, a multi-dimensional user state of the user, the multi-dimensional user state having a plurality of dimensions, where at least one dimension in the plurality of dimensions is time;
sending, to a content database, a request for a list of available content;
receiving, from the content database, the list of available content;
ranking content within the list of available content based on a comparison to the multi-dimensional user state, resulting in a ranked list of available content; and
transmitting, to the computing device, a suggestion comprising at least a top-ranked item within the ranked list of available content.

12. The system of claim 11, wherein the sensor is a component of a wearable device.

13. The system of claim 12, wherein:
the wearable device is a smartwatch worn by the user;
the sensor is a component of the smartwatch; and
the physiological data captured by the sensor comprises a heartbeat of the user captured by the smartwatch.

14. The system of claim 11, wherein:
the sensor is a camera; and
the physiological data captured by the sensor comprises facial movement of the user captured by the camera.

15. The system of claim 11, the non-transitory computer-readable storage medium having additional instructions stored which, when executed by the processor, cause the processor to perform operations comprising:
receiving keystroke data from a keyboard of the computing device; and
receiving mouse movement data from a mouse of the computing device,
wherein the generating of the multi-dimensional user state is further based on the keystroke data and the mouse movement data.

16. The system of claim 11, the non-transitory computer-readable storage medium having additional instructions stored which, when executed by the processor, cause the processor to perform operations comprising:
receiving tactile data from a touchscreen of the computing device,
wherein the generating of the multi-dimensional user state is further based on the tactile data.

17. The system of claim 11, wherein the user data comprises:
previous content provided to the user;
previous physiological data of the user while the previous content was provided to the user;
previous user actions made by the user while the previous content was provided to the user; and
previous multi-dimensional user states of the user based on the previous content and the previous physiological data.

18. The system of claim 11, wherein:
the user data comprises a user profile of the user, the user profile classifying the user as having user states similar to those of a group of other users; and
generating the multi-dimensional user state of the user is further based on how the user and the group of other users have previously reacted in similar circumstances.

19. A non-transitory computer-readable storage medium having instructions stored which, when executed by the processor, cause the processor to perform operations comprising:
receiving subjective psychological data associated with a user;
receiving, from a computing device, location data of the user;
receiving behavioral data of the user;
generating, based on the (1) subjective psychological data, (2) the location data, and (3) the behavioral data, a multi-dimensional user state of the user, the multi-dimensional user state having a plurality of dimensions, where at least one dimension in the plurality of dimensions is time;
sending, to a content database, a request for a list of available content;
receiving, from the content database, the list of available content;
ranking content within the list of available content based on a comparison to the multi-dimensional user state, resulting in a ranked list of available content; and
transmitting, to the computing device, a suggestion comprising at least a top-ranked item within the ranked list of available content.

* * * * *